United States Patent
Javitt et al.

(10) Patent No.: US 11,176,116 B2
(45) Date of Patent: Nov. 16, 2021

(54) SYSTEMS AND METHODS FOR ANNOTATING DATASETS

(71) Applicant: Palantir Technologies Inc., Palo Alto, CA (US)

(72) Inventors: Gabrielle Javitt, New York, NY (US); Samuel Szuflita, New York, NY (US); Satej Soman, Cupertino, CA (US); Harsh Pandey, New York, NY (US); Siddharth Dhulipalla, Belmont, CA (US); Vipul Shekhawat, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 324 days.

(21) Appl. No.: 16/138,759

(22) Filed: Sep. 21, 2018

(65) Prior Publication Data
US 2019/0179936 A1 Jun. 13, 2019

Related U.S. Application Data (60) Provisional application No. 62/598,299, filed on Dec. 13, 2017.

(51) Int. Cl.
*G06F 16/23* (2019.01)
*G06F 16/22* (2019.01)

(52) U.S. Cl.
CPC ...... *G06F 16/2365* (2019.01); *G06F 16/2282* (2019.01)

(58) Field of Classification Search
CPC ............. G06F 16/2365; G06F 16/2282; G06F 16/2428; G06F 16/2455; G06F 16/2456;
(Continued)

(56) References Cited

U.S. PATENT DOCUMENTS

| | | |
|---|---|---|
| 5,418,950 A | 5/1995 | Li et al. |
| 5,428,737 A | 6/1995 | Li et al. |

(Continued)

FOREIGN PATENT DOCUMENTS

| | | |
|---|---|---|
| DE | 102014103482 | 9/2014 |
| EP | 1647908 | 4/2006 |

(Continued)

OTHER PUBLICATIONS

"A Quick Guide to UniProtKB Swiss-Prot & TrEMBL," Sep. 2011, pp. 2.

(Continued)

*Primary Examiner* — Angelica Ruiz
(74) *Attorney, Agent, or Firm* — Sheppard Mullin Richter & Hampton LLP (57) ABSTRACT

Disclosed herein are systems and methods for joining datasets. The system may include one or more processors and a memory storing instructions that, when executed by the one or more processors. The processor may cause the system to perform determining at least a first database table to be annotated, the first database table including a set of columns and rows of a dataset. In some embodiments, the system may include determining at least one typeclass that applies to one or more columns included in the first database table, wherein the typeclass describes values stored in the one or more columns and annotating the one or more columns, wherein the annotated columns are associated with the typeclass.

19 Claims, 6 Drawing Sheets

(58) Field of Classification Search
CPC ......... G06F 16/24561; G06F 16/24568; G06F 16/2477; G06F 16/248
See application file for complete search history.

(56) References Cited

U.S. PATENT DOCUMENTS

| | | | |
|---|---|---|---|
| 5,428,776 A | 6/1995 | Rothfield | |
| 5,542,089 A | 7/1996 | Lindsay et al. | |
| 5,608,899 A | 3/1997 | Li et al. | |
| 5,613,105 A | 3/1997 | Xbikowski et al. | |
| 5,701,456 A | 12/1997 | Jacopi et al. | |
| 5,724,575 A | 3/1998 | Hoover et al. | |
| 5,794,228 A | 8/1998 | French et al. | |
| 5,794,229 A | 8/1998 | French et al. | |
| 5,857,329 A | 1/1999 | Bingham | |
| 5,911,138 A | 6/1999 | Li et al. | |
| 5,918,225 A | 6/1999 | White et al. | |
| 6,208,985 B1 | 3/2001 | Krehel | |
| 6,236,994 B1 | 5/2001 | Swartz et al. | |
| 6,289,334 B1 | 9/2001 | Reiner et al. | |
| 6,311,181 B1 | 10/2001 | Lee et al. | |
| 6,321,274 B1 | 11/2001 | Shakib et al. | |
| 6,356,896 B1* | 3/2002 | Cheng | G06F 16/2423 |
| 6,643,613 B2 | 11/2003 | McGee et al. | |
| 6,745,382 B1 | 6/2004 | Zothner | |
| 6,851,108 B1 | 2/2005 | Syme et al. | |
| 6,857,120 B1 | 2/2005 | Arnold et al. | |
| 6,877,137 B1 | 4/2005 | Rivette et al. | |
| 6,976,024 B1 | 12/2005 | Chavez et al. | |
| 7,028,223 B1 | 4/2006 | Kolawa et al. | |
| 7,085,890 B2 | 8/2006 | Kashyap | |
| 7,155,728 B1 | 12/2006 | Prabhu et al. | |
| 7,216,133 B2 | 5/2007 | Wu et al. | |
| 7,406,592 B1 | 7/2008 | Polyudov | |
| 7,519,589 B2 | 4/2009 | Charnock et al. | |
| 7,546,353 B2 | 6/2009 | Hesselink et al. | |
| 7,610,290 B2 | 10/2009 | Kruy et al. | |
| 7,627,489 B2 | 12/2009 | Schaeffer et al. | |
| 7,783,679 B2 | 8/2010 | Bley | |
| 7,853,573 B2 | 12/2010 | Warner et al. | |
| 7,877,421 B2 | 1/2011 | Berger et al. | |
| 7,908,521 B2 | 3/2011 | Sridharan et al. | |
| 7,979,424 B2 | 7/2011 | Dettinger et al. | |
| 8,073,857 B2 | 12/2011 | Sreekanth | |
| 8,103,962 B2 | 1/2012 | Embley et al. | |
| 8,417,715 B1 | 4/2013 | Bruckhaus et al. | |
| 8,429,194 B2 | 4/2013 | Aymeloglu et al. | |
| 8,433,702 B1 | 4/2013 | Carrino et al. | |
| 8,499,287 B2 | 7/2013 | Shafi et al. | |
| 8,560,494 B1 | 10/2013 | Downing | |
| 8,639,552 B1 | 1/2014 | Chen et al. | |
| 8,799,867 B1 | 8/2014 | Peri-Glass et al. | |
| 8,909,597 B2 | 12/2014 | Aymeloglu et al. | |
| 8,924,429 B1 | 12/2014 | Fisher et al. | |
| 8,935,201 B1 | 1/2015 | Fisher et al. | |
| 9,031,981 B1 | 5/2015 | Potter et al. | |
| 9,105,000 B1 | 8/2015 | White et al. | |
| 9,292,388 B2 | 3/2016 | Fisher et al. | |
| 9,330,120 B2 | 5/2016 | Colgrove et al. | |
| 9,348,677 B2 | 5/2016 | Marinelli, III et al. | |
| 9,378,526 B2 | 6/2016 | Sampson | |
| 2002/0184111 A1 | 12/2002 | Swanson | |
| 2003/0004770 A1 | 1/2003 | Miller et al. | |
| 2003/0023620 A1 | 1/2003 | Trotta | |
| 2003/0105833 A1 | 6/2003 | Daniels | |
| 2003/0212670 A1 | 11/2003 | Yalamanchi et al. | |
| 2004/0088177 A1 | 5/2004 | Travis et al. | |
| 2004/0098731 A1 | 5/2004 | Demsey et al. | |
| 2004/0103088 A1 | 5/2004 | Cragun et al. | |
| 2004/0126840 A1 | 7/2004 | Cheng et al. | |
| 2004/0139212 A1 | 7/2004 | Mukherjee et al. | |
| 2004/0153837 A1 | 8/2004 | Preston et al. | |
| 2004/0193608 A1 | 9/2004 | Gollapudi et al. | |
| 2004/0254658 A1 | 12/2004 | Sherriff et al. | |
| 2004/0260702 A1 | 12/2004 | Cragun et al. | |
| 2005/0004911 A1 | 1/2005 | Goldberg et al. | |
| 2005/0021397 A1 | 1/2005 | Cui et al. | |
| 2005/0120080 A1 | 6/2005 | Weinreb et al. | |
| 2005/0183005 A1 | 8/2005 | Denoue et al. | |
| 2005/0226473 A1 | 10/2005 | Ramesh | |
| 2005/0278286 A1 | 12/2005 | Djugash et al. | |
| 2006/0004740 A1 | 1/2006 | Dettinger et al. | |
| 2006/0070046 A1 | 3/2006 | Balakrishnan et al. | |
| 2006/0074967 A1 | 4/2006 | Shaburov | |
| 2006/0080616 A1 | 4/2006 | Vogel et al. | |
| 2006/0116991 A1 | 6/2006 | Calderwood | |
| 2006/0129992 A1 | 6/2006 | Oberholtzer et al. | |
| 2006/0142949 A1 | 6/2006 | Helt | |
| 2006/0209085 A1 | 9/2006 | Wong et al. | |
| 2006/0271838 A1 | 11/2006 | Carro | |
| 2006/0271884 A1 | 11/2006 | Hurst | |
| 2006/0288046 A1 | 12/2006 | Gupta et al. | |
| 2007/0005582 A1 | 1/2007 | Navratil et al. | |
| 2007/0027851 A1 | 2/2007 | Kruy et al. | |
| 2007/0094248 A1 | 4/2007 | McVeigh et al. | |
| 2007/0113164 A1 | 5/2007 | Hansen et al. | |
| 2007/0150805 A1 | 6/2007 | Misovski | |
| 2007/0168336 A1 | 7/2007 | Ransil et al. | |
| 2007/0178501 A1 | 8/2007 | Rabinowitz et al. | |
| 2007/0192281 A1 | 8/2007 | Cradick et al. | |
| 2007/0260582 A1 | 11/2007 | Liang | |
| 2008/0126344 A1 | 5/2008 | Hoffman et al. | |
| 2008/0126951 A1 | 5/2008 | Sood et al. | |
| 2008/0155440 A1 | 6/2008 | Trevor et al. | |
| 2008/0196016 A1 | 8/2008 | Todd | |
| 2008/0201313 A1 | 8/2008 | Dettinger et al. | |
| 2008/0215543 A1 | 9/2008 | Huang et al. | |
| 2008/0267386 A1 | 10/2008 | Cooper | |
| 2009/0006150 A1 | 1/2009 | Prigge et al. | |
| 2009/0007056 A1 | 1/2009 | Prigge et al. | |
| 2009/0043762 A1 | 2/2009 | Shiverick et al. | |
| 2009/0055487 A1 | 2/2009 | Moraes et al. | |
| 2009/0083275 A1 | 3/2009 | Jacob et al. | |
| 2009/0094217 A1 | 4/2009 | Dettinger et al. | |
| 2009/0144747 A1 | 6/2009 | Baker | |
| 2009/0161147 A1 | 6/2009 | Klave | |
| 2009/0172674 A1 | 7/2009 | Bobak et al. | |
| 2009/0187556 A1 | 7/2009 | Ross et al. | |
| 2009/0193012 A1 | 7/2009 | Williams | |
| 2009/0199047 A1 | 8/2009 | Vaitheeswaran et al. | |
| 2009/0248721 A1 | 10/2009 | Burton et al. | |
| 2009/0282068 A1 | 11/2009 | Shockro et al. | |
| 2009/0299830 A1 | 12/2009 | West et al. | |
| 2010/0011282 A1 | 1/2010 | Dollard et al. | |
| 2010/0070464 A1 | 3/2010 | Aymeloglu et al. | |
| 2010/0073315 A1 | 3/2010 | Lee et al. | |
| 2010/0082671 A1 | 4/2010 | Li et al. | |
| 2010/0145902 A1 | 6/2010 | Boyan et al. | |
| 2010/0161646 A1 | 6/2010 | Ceballos et al. | |
| 2010/0169376 A1 | 7/2010 | Chu | |
| 2010/0169405 A1 | 7/2010 | Zhang | |
| 2010/0199167 A1 | 8/2010 | Uematsu et al. | |
| 2010/0313119 A1 | 12/2010 | Baldwin et al. | |
| 2011/0035396 A1 | 2/2011 | Merz et al. | |
| 2011/0041084 A1 | 2/2011 | Karam | |
| 2011/0047525 A1* | 2/2011 | Castellanos | G06F 16/283 717/104 |
| 2011/0066497 A1 | 3/2011 | Gopinath et al. | |
| 2011/0074811 A1 | 3/2011 | Hanson et al. | |
| 2011/0093490 A1 | 4/2011 | Schindlauer et al. | |
| 2011/0131547 A1 | 6/2011 | Elaasar | |
| 2011/0145401 A1 | 6/2011 | Westlake | |
| 2011/0208822 A1 | 8/2011 | Rathod | |
| 2011/0252282 A1 | 10/2011 | Meek et al. | |
| 2011/0258216 A1 | 10/2011 | Supakkul et al. | |
| 2011/0270871 A1 | 11/2011 | He et al. | |
| 2011/0321008 A1 | 12/2011 | Jhoney et al. | |
| 2012/0078595 A1 | 3/2012 | Balandin et al. | |
| 2012/0102022 A1 | 4/2012 | Miranker et al. | |
| 2012/0159449 A1 | 6/2012 | Arnold et al. | |
| 2012/0173381 A1 | 7/2012 | Smith | |
| 2012/0174057 A1 | 7/2012 | Narendra et al. | |
| 2012/0188252 A1 | 7/2012 | Law | |
| 2012/0284719 A1 | 11/2012 | Phan et al. | |

(56) References Cited

U.S. PATENT DOCUMENTS

| | | |
|---|---|---|
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2014/0012886 A1 | 1/2014 | Downing et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0214579 A1 | 7/2014 | Shen et al. |
| 2014/0244388 A1 | 8/2014 | Manouchehri et al. |
| 2015/0112641 A1 | 4/2015 | Faraj |
| 2015/0269030 A1 | 9/2015 | Fisher et al. |
| 2016/0026923 A1 | 1/2016 | Erenrich et al. |
| 2016/0217148 A1* | 7/2016 | Branson ............ G06F 16/24568 |
| 2016/0350369 A1* | 12/2016 | He .................... G06F 16/24537 |
| 2017/0262491 A1* | 9/2017 | Brewster ............. G06F 16/2365 |
| 2019/0079978 A1* | 3/2019 | Ali .................... G06F 16/24573 |

FOREIGN PATENT DOCUMENTS

| | | |
|---|---|---|
| EP | 2 634 745 | 9/2013 |
| EP | 2743839 | 6/2014 |
| EP | 2778986 | 9/2014 |
| EP | 2921975 | 9/2015 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2010/030917 | 3/2010 |
| WO | WO 2013/030595 | 3/2013 |

OTHER PUBLICATIONS

"A Tour of Pinboard," <http://pinboard.in/tour> as printed May 15, 2014 in 6 pages.
"The FASTA Program Package," fasta-36.3.4, Mar. 25, 2011, pp. 29.
"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.
Alur et al., "Chapter 2: IBM InfoSphere DataStage Stages," IBM InfoSphere DataStage Data Flow and Job Design, Jul. 1, 2008, pp. 35-137.
Anonymous, "Frequently Asked Questions about Office Binder 97," http://web.archive.org/web/20100210112922/http://support.microsoft.com/kb/843147 printed Dec. 18, 2006 in 5 pages.
Bae et al., "Partitioning Algorithms for the Computation of Average Iceberg Queries," DaWaK 2000, LNCS 1874, pp. 276_286.
Ballesteros et al., "Batching: A Design Pattern for Efficient and Flexible Client/Server Interaction," Transactions on Pattern Languages of Programming, Springer Berlin Heildeberg, 2009, pp. 48-66.
Bogle et al., "Reducing Cross-Domain Call Overhead Using Batched Futures," SIGPLAN No. 29, 10 (Oct. 1994) pp. 341-354.
Bogle, Phillip Lee, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.
Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
Frantisek et al., "An Architectural View of Distributed Objects and Components in CORBA, Java RMI and COM/DCOM," Software—Concepts & Tools, vol. 19, No. 1, Jun. 1, 1998, pp. 14-28.
Goldstein et al., "Stacks Lazy Threads: Implementing a Fast Parallel Call," Journal of Parallel and Distributed Computing, Jan. 1, 1996, pp. 5-20.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, p. 51Ð55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Notice of Acceptance for New Zealand Patent Application No. 616212 dated Jan. 23, 2015.
Notice of Acceptance for New Zealand Patent Application No. 616299 dated Apr. 7, 2015.
Notice of Acceptance for New Zealand Patent Application No. 622485 dated Nov. 24, 2014.
Notice of Allowance for U.S. Appl. No. 13/411,291 dated Apr. 22, 2016.
Notice of Allowance for U.S. Appl. No. 13/657,635 dated Jan. 29, 2016.
Notice of Allowance for U.S. Appl. No. 13/657,656 dated May 10, 2016.
Notice of Allowance for U.S. Appl. No. 13/767,779 dated Mar. 17, 2015.
Notice of Allowance for U.S. Appl. No. 13/827,627 dated Apr. 11, 2016.

(56) References Cited

OTHER PUBLICATIONS

Notice of Allowance for U.S. Appl. No. 14/019,534 dated Feb. 4, 2016.
Notice of Allowance for U.S. Appl. No. 14/254,757 dated Sep. 10, 2014.
Notice of Allowance for U.S. Appl. No. 14/254,773 dated Aug. 20, 2014.
Notice of Allowance for U.S. Appl. No. 14/304,741 dated Apr. 7, 2015.
Notice of Allowance for U.S. Appl. No. 14/581,902 dated Nov. 13, 2015.
Notice of Allowance for U.S. Appl. No. 15/066,970 dated Jun. 29, 2016.
Official Communication for Australian Patent Application No. 2013237658 dated Feb. 2, 2015.
Official Communication for Australian Patent Application No. 2013237710 dated Jan. 16, 2015.
Official Communication for Australian Patent Application No. 2014201580 dated Feb. 27, 2015.
Official Communication for Canadian Patent Application No. 2,807,899 dated Jun. 14, 2016.
Official Communication for Canadian Patent Application No. 2807899 dated Oct. 24, 2014.
Official Communication for Canadian Patent Application No. 2807899 dated Jul. 20, 2015.
Official Communication for Canadian Patent Application No. 2828264 dated Apr. 11, 2016.
Official Communication for Canadian Patent Application No. 2828264 dated Apr. 28, 2015.
Official Communication for Canadian Patent Application No. 2829266 dated Apr. 1, 2016.
Official Communication for Canadian Patent Application No. 2829266 dated Apr. 28, 2015.
Official Communication for European Patent Application No. 13157474.1 dated Apr. 29, 2016.
Official Communication for European Patent Application No. 13157474.1 dated Oct. 30, 2015.
Official Communication for European Patent Application No. 14159175.0 dated Feb. 4, 2016.
Official Communication for European Patent Application No. 14159175.0 dated Jul. 17, 2014.
Official Communication for European Patent Application No. 14159464.8 dated Feb. 18, 2016.
Official Communication for European Patent Application No. 14159629.6 dated Jul. 31, 2014.
Official Communication for European Patent Application No. 14159629.6 dated Sep. 22, 2014.
Official Communication for European Patent Application No. 15159520.4 dated Jul. 15, 2015.
Official Communication for German Patent Application No. 10 2013 221 052.3 dated Mar. 24, 2015.
Official Communication for German Patent Application No. 10 2013 221 057.4 dated Mar. 23, 2015.
Official Communication for Great Britain Patent Application No. 1404574.4 dated Dec. 18, 2014.
Official Communication for Netherlands Patent Application No. 2012437 dated Sep. 18, 2015.
Official Communication for Netherlands Patent Application No. 2011627 dated Aug. 14, 2015.
Official Communication for Netherlands Patent Application No. 2011613 dated Aug. 13, 2015.
Official Communication for New Zealand Patent Application No. 616299 dated Jan. 26, 2015.
Official Communication for New Zealand Patent Application No. 622414 dated Mar. 24, 2014.
Official Communication for New Zealand Patent Application No. 622484 dated Apr. 2, 2014.
Official Communication for New Zealand Patent Application No. 622485 dated Nov. 21, 2014.
Official Communication for U.S. Appl. No. 13/411,291 dated Jul. 15, 2015.
Official Communication for U.S. Appl. No. 13/411,291 dated Oct. 1, 2015.
Official Communication for U.S. Appl. No. 13/608,864 dated Jun. 8, 2015.
Official Communication for U.S. Appl. No. 13/608,864 dated Mar. 17, 2015.
Official Communication for U.S. Appl. No. 13/657,635 dated Mar. 30, 2015.
Official Communication for U.S. Appl. No. 13/657,635 dated Oct. 7, 2015.
Official Communication for U.S. Appl. No. 13/657,656 dated Oct. 7, 2014.
Official Communication for U.S. Appl. No. 13/657,656 dated May 6, 2015.
Official Communication for U.S. Appl. No. 13/827,627 dated Oct. 20, 2015.
Official Communication for U.S. Appl. No. 13/827,627 dated Dec. 22, 2015.
Official Communication for U.S. Appl. No. 13/827,627 dated Mar. 2, 2015.
Official Communication for U.S. Appl. No. 13/827,627 dated Aug. 26, 2015.
Official Communication for U.S. Appl. No. 13/831,791 dated Aug. 6, 2015.
Official Communication for U.S. Appl. No. 13/831,791 dated Mar. 4, 2015.
Official Communication for U.S. Appl. No. 14/019,534 dated Jul. 20, 2015.
Official Communication for U.S. Appl. No. 14/019,534 dated Sep. 4, 2015.
Official Communication for U.S. Appl. No. 14/025,653 dated Mar. 3, 2016.
Official Communication for U.S. Appl. No. 14/025,653 dated Oct. 6, 2015.
Official Communication for U.S. Appl. No. 14/134,558 dated Aug. 26, 2016.
Official Communication for U.S. Appl. No. 14/134,558 dated May 16, 2016.
Official Communication for U.S. Appl. No. 14/134,558 dated Oct. 7, 2015.
Official Communication for U.S. Appl. No. 14/304,741 dated Mar. 3, 2015.
Official Communication for U.S. Appl. No. 14/304,741 dated Aug. 6, 2014.
Official Communication for U.S. Appl. No. 14/877,229 dated Mar. 22, 2016.
Russell et al., "NITELIGHT: A Graphical Tool for Semantic Query Construction," 2008, pp. 10.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008),ÊAcitrezza, Catania, Italy, Sept.Ê29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
Wikipedia, "Machine Code", p. 1-5, printed Aug. 11, 2014.
Wollrath et al., "A Distributed Object Model for the Java System," Proceedings of the 2nd Conference on USENEX, Conference on Object-Oriented Technologies (COOTS), Jun. 17, 1996, pp. 219-231.

* cited by examiner

|  | 305a | 305b | 305c | 305d |  |  |  |
|---|---|---|---|---|---|---|---|
|  | Timestamp | Employee Number | Employee ID | Username | Email | First Name | Last Name |
|  | Data String | Data String | Data String | Data String | Data String | Data String | Data String |
|  | Data String | Data String | Data String | Data String | Data String | Data String | Data String |
|  | Data String | Data String | Data String | Data String | Data String | Data String | Data String |
|  | Data String | Data String | Data String | Data String | Data String | Data String | Data String |
|  | Data String | Data String | Data String | Data String | Data String | Data String | Data String |

SYSTEMS AND METHODS FOR ANNOTATING DATASETS

CROSS REFERENCE TO RELATED APPLICATIONS

This application claims the benefit under 35 U.S.C. § 119(e) of U.S. Provisional Application Ser. No. 62/598,299 filed Dec. 13, 2017, the content of which is incorporated by reference in its entirety into the present disclosure.

BACKGROUND

Technical Field

This disclosure relates to approaches for annotating datasets, and more particularly, for annotating datasets based on identified relationships between the datasets.

Description of Related Art

Databases may often include a considerable number of datasets amassed together without any foundational organization or structure. As a result, while such databases may include the necessary data to provide a wide array of information for data analysis, users may not be able to locate the necessary data needed to combine, join, and bolster a select dataset for any such meaningful analysis.

Conventional approaches may limit the analysis of data for users who have no way of knowing the types of information already stored in datasets being managed by the database. Indeed, a database may include hundreds, if not thousands, of disparate datasets. Additionally, other conventional approaches may join datasets within a database, but may join the datasets up-front, often before a user has a chance to evaluate whether the datasets are comparable. Thus, conventional approaches may make it difficult to identify the datasets that can be joined together. Conventional approaches may also limit the flexibility of users who have not decided whether they would like to join any such datasets together.

SUMMARY

Various embodiments of the present disclosure include systems, methods, and non-transitory computer readable media configured to annotate and join datasets. The system may include one or more processors and a memory storing instructions that, when executed by the one or more processors, cause the system to perform determining at least a first database table to be annotated, the first database table including a set of columns and rows of a dataset. Some embodiments may further include determining at least one typeclass that applies to one or more columns included in the first database table, wherein the typeclass describes values stored in the one or more columns and annotating the one or more columns, wherein the annotated columns are associated with the typeclass.

In some embodiments, the typeclass describes metadata information for the one or more columns.

In some embodiments, the metadata information describes a data type corresponding to data values in the one or more columns.

In some embodiments, the metadata information describes a data format corresponding to data values in the one or more columns.

In some embodiments, the typeclass is associated with one or more data validations.

In some embodiments, the data validations are automatically applied to validate values stored in the one or more columns.

In some embodiments, the systems, methods, and non-transitory computer readable media are configured to join the first database table with at least one second database table based at least in part on the one or more annotated columns.

BRIEF DESCRIPTION OF THE DRAWINGS

Features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

A claimed solution rooted in computer technology overcomes problems specifically arising in the realm of computer technology. In various embodiments, an interface for curating and managing data is provided. The interface can allow users to associate columns of database tables with various typeclasses. In some embodiments, a typeclass can be used to describe metadata information for a given column. In some embodiments, a typeclass can be associated with one or more validations that can be used to evaluate data corresponding a given column. In some embodiments, datasets can automatically be enriched based on typeclasses. For example, typeclasses can be used to join data stored in disparate database tables. In some embodiments, typeclasses can automatically be suggested for database tables. For example, a typeclass can automatically be suggested for a given column based on a data type associated with the column or a pattern recognized in data values stored in the column.

Figure 1:
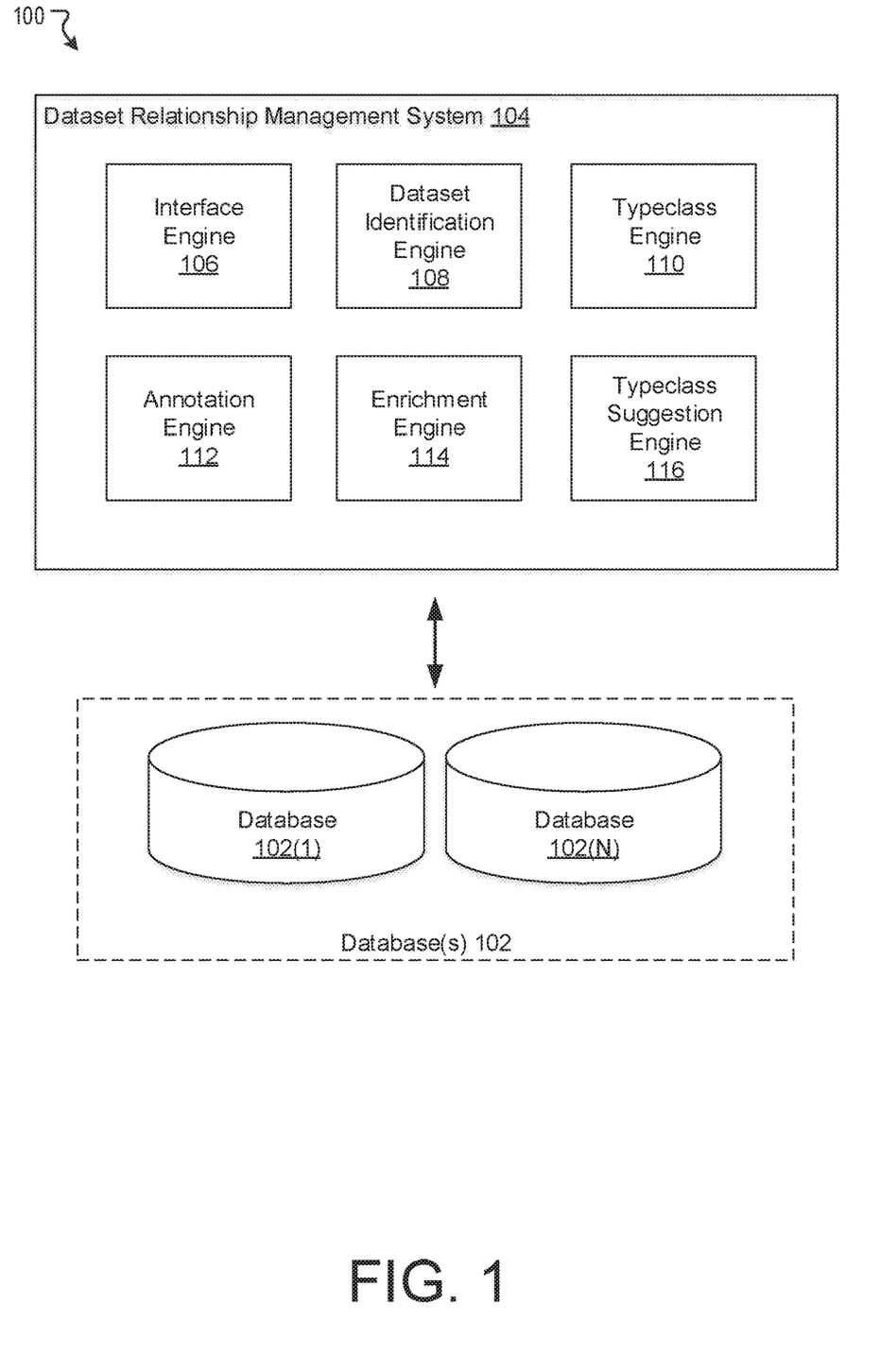
FIG. 1 is a diagram of an example of a dataset relationship management environment, per some embodiments.

FIG. 1 is a diagram of an example of a dataset relationship management environment 100, per some embodiments. The dataset relationship management environment 100 shown in FIG. 1 includes one or more database(s) 102 (shown as a first database 102(1) through an Nth database 102(N) (where "N" may represent an arbitrary integer)) and a dataset relationship management system 104. The database(s) 102 and the dataset relationship management system 104 may be coupled to one another through one or more computer networks (e.g., LAN, WAN, or the like) or another transmission media. The computer networks and/or transmission media may provide communication between the database(s) 102 and the dataset relationship management system 104 and/or between components in those systems. Communication networks and transmission mediums are discussed further herein.

The database(s) 102 may include one or more databases configured to store data. The database(s) 102 may include tables, comma-separated values (CSV) files, structured databases (e.g., those structured in Structured Query Language (SQL)), or other applicable known or convenient organizational formats. The database(s) 102 may support queries and/or other requests for data from other modules, such as the dataset relationship management system 104. In some embodiments, the database(s) 102 may provide stored data in response to the queries/requests. The databases may include "datasets," which as used herein, may refer to collections of data within a database. A dataset may include all data in a database that follows a specific format or structure. In some embodiments, a dataset corresponds to one or more database tables that include one or more columns and one or more rows. In such embodiments, database tables can be populated with data values in corresponding rows and columns.

The dataset relationship management system 104 may include modules configured to annotate datasets (e.g., database table columns), determine relationships between such datasets, and enrich such datasets with other related datasets. The dataset relationship management system 104 includes an interface engine 106, a dataset identification engine 108, a typeclass engine 110, an annotation engine 112, an enrichment engine 114, and a typeclass suggestion engine 116.

The interface engine 106 can be configured to provide an interface (e.g., graphical user interface, application programming interface) for curating and managing datasets. The interface may be provided through a display screen of a computing device by a software application (e.g., web browser, standalone app, etc.) running on the computing device. The computing device can include one or more processors and memory. For example, in some embodiments, the interface can provide options for annotating datasets (e.g., database table columns) with various typeclasses. In some embodiments, a typeclass can be used to describe metadata information for a given dataset. In some embodiments, a typeclass can be associated with one or more validations that can be used to evaluate data corresponding a given dataset. In some embodiments, the interface can provide options for enriching datasets. For example, in some embodiments, the interface can provide options for enriching data in a first dataset (e.g., database table) with data from a second dataset (e.g., database table). In some embodiments, the interface can provide typeclass suggestions for annotating datasets (e.g., database table columns). Many variations are possible.

The dataset identification engine 108 may be configured to identify datasets of interest in the database(s) 102. The dataset identification engine 108 may be configured to execute specific queries to identify specific or related datasets from the database(s) 102. In some embodiments, the dataset identification engine 108 may identify datasets located in tables, and thus identify the specific columns and/or rows associated with a selected database table from the database(s) 102. In some embodiments, the dataset identification engine 108 is configured to identify and search tables and their columns and rows from the database(s) 102. In various embodiments, the dataset identification engine 108 is configured to identify datasets that match date and/or time ranges, responsive to keyword searches, fall within subject areas of interest, responsive to structured and/or unstructured queries, and/or the like. In some implementations, the dataset identification engine 108 receives instructions from a user to identify the datasets of interest. The dataset identification engine 108 may also receive instructions from automated agents, such as automated processes executed on the dataset relationship management system 104, to identify the datasets of interest. In one example, the automated agents may look to see if data correlates to another dataset based on an overlap of data type, similar data structure, similar subject area of interest, and/or the like. The dataset identification engine 108 may provide the identified datasets of interest to one or more other engines for processing (or analysis).

The typeclass engine 110 may be configured to store typeclasses and assign typeclasses to particular datasets (e.g., database table columns) in the database(s) 102. In some embodiments, a typeclass can be used to describe metadata information for a given column. For example, a typeclass can be associated with a pre-determined data format or type. For example, a "social security number" typeclass may be associated with a pre-determined data format that corresponds to a 9 digit number that may formatted as three digits, followed by a hyphen, another two digits, followed by a hyphen, and finally four more digits (e.g., "###-##-####"). In another example, a "user identifier" typeclass may be associated with a pre-determined type that identifies data values as being user identifiers in a given database table. In some embodiments, columns in a database table can be annotated (or labeled) using one or more typeclasses to identify the type of data values that are included in a given column. For example, a column that includes data values corresponding to social security numbers can be annotated using the "social security number" typeclass. In another example, a column that includes data values corresponding to user identifiers can be annotated with the "user identifier" typeclass. Many variations are possible. For example, a column may be associated with the "email address" typeclass if data values in the column satisfy an email address format associated with the typeclass (e.g., "username" followed by "@" followed by a top-level domain). In another example, a column annotated with a "phone number" typeclass may include data values that correspond to a three digit number followed by a hyphen followed by another three digit number followed by a four digit number (e.g., "###-###-####"). In various embodiments, a data format associated with a typeclass can be defined as a pattern using regular expressions. Again, many variations are possible.

In various embodiments, the typeclass engine 110 may be configured to ensure data values satisfy various validation rules. For example, in some embodiments, a typeclass can be associated with one or more validations (or validation rules) that can be used to evaluate data corresponding to a given dataset (e.g., database table column). Such data validation rules can vary depending on the typeclass. For example, a "username" typeclass may be associated with a first data validation rule that ensures data values are alphanumeric and a second validation rule that ensures data values are all lowercase. In this example, data values in a table column annotated with the "username" typeclass can be validated using both the first data validation rule and the second data validation rule. Additionally, in some embodiments, the typeclass engine 110 may further be configured such that any data values from two or more columns are only combined (or joined) if the data values are associated with the same typeclass.

The annotation engine 112 may be configured to annotate datasets (e.g., columns in a database table) with one or more typeclasses. In various embodiments, the annotation engine 112 can be instructed to annotate a given database table column with a given typeclass either manually or using automated approaches. For example, in some embodiments, a user can manually identify datasets to be annotated using one or more selected typeclasses. In some embodiments, the annotation engine 112 can automatically identify datasets to be annotated using one or more suggested typeclasses. For example, in some embodiments, the annotation engine 112 can evaluate data values in a given database table column to infer, or determine, whether the data values correspond to particular data types and/or data formats. For example, the annotation engine 112 can determine that the evaluated data values correspond to email addresses. In some embodiments, this determination can be made in view of keywords (e.g., text) identified in the evaluated data values. For example, the annotation engine 112 can determine that portions of the evaluated data values include domain names of popular email services. In this example, the annotation engine 112 can determine that the data values correspond to email addresses. In another example, the annotation engine 112 can determine that the evaluated data values correspond to email addresses based on pre-defined data formats (or patterns) reflected in the data values. For example, the data values may tend to follow a same, or similar pattern such as including an at sign (i.e., "@"), followed by a domain name, and then a top-level domain (e.g., ".com", ".org", etc.). Many variations are possible. Next, the annotation engine 112 can determine any typeclasses that are applicable to those determined particular data types and/or data formats. For example, the annotation engine 112 can determine whether the data types and/or data formats match data types and/or data formats associated with any typeclasses. When a match is determined, the annotation engine 112 can automatically suggest a corresponding typeclass associated with the matching data types and/or data formats to be used for annotating the database table column. In the foregoing example, the database table column from which the data values were evaluated can be labeled (or annotated) with a typeclass that corresponds to email addresses. Once labeled, the data values included in the labeled database table column can be subsequently identified based on its typeclass without having to re-evaluate the data values.

The enrichment engine 114 may be configured to identify relationships between datasets identified, for example, by the dataset identification engine 108, typeclass engine 110, and/or the annotation engine 112. In some embodiments, a first dataset and a second dataset may be determined to be related if the two datasets share at least one typeclass. For example, a first database table may include a column associated with a "username" typeclass. Similarly, a second database table may include also include a column associated with the "username" typeclass. In this example, these columns and tables can be determined to be related based on the shared "username" typeclass. As a result, data in the first database table can be enriched using data from the second database table. Many variations are possible.

In some embodiments, the enrichment engine 114 may be used to determine which data values from datasets can be joined or combined. For example, a column (e.g., a column that includes data corresponding to vehicle models) in a first database table corresponding to vehicle information can be annotated with a "vehicle model" typeclass. Similarly, a column (e.g., a column that also includes data corresponding to vehicle models) in a second database table can also be annotated with the "vehicle model" typeclass. In this example, the enrichment engine 114 can determine that both the first and second database tables can be joined at the columns annotated with the "vehicle model" typeclass. In some embodiments, the enrichment engine 114 automatically generates a view of the joined datasets. In some embodiments, the enrichment engine 114 provides the datasets as suggested joins. Many variations are possible.

In some embodiments, the enrichment engine 114 may analyze datasets to determine similar or related data qualities, data characteristics, and/or data patterns. In such embodiments, the enrichment engine 114 can automatically associate datasets with appropriate typeclasses based on the analysis. For example, a database table column may include values that correspond to a particular data format. In this example, this particular data format may be associated with a given typeclass. As a result, the enrichment engine 114 can automatically associate the database table column with the typeclass. For example, a database table column that includes values corresponding to a social security number format can automatically be annotated with a "social security number" typeclass that is associated with the social security number format. Many variations are possible. Additionally, in some embodiments, typeclasses assigned to a first database column can automatically be assigned (or propagated) to a second database column based on an overlap between data values in the first database column and data values in the second database column. For example, an overlap can be contextually and/or statistically determined based on some relationship between the two sets of data values. Such relationships may be determined based on the data values themselves and/or on data formats determined for those data values, as described above. Many variations are possible. For example, data values (e.g., A152-MAX, A152-JUMBO, B550-TWIN, etc.) in a first database table column may be annotated using product model typeclass. In this example, the enrichment engine 114 can evaluate data values (e.g., A220-WIDE, A680-JET, C110-PRO, etc.) in a second database table column to determine a likelihood of correspondence between data values in the first database table column and data values in the second database table column. If the likelihood of correspondence between data values in the first database table column and data values in the second database table column satisfies a threshold (e.g., at least a 90 percent), then the enrichment engine 114 can automatically label the second database table column using the product model typeclass. When determining a likelihood of correspondence between a first set of data values and a second set of data values, the enrichment engine 114 may consider many factors. For example, in some embodiments, the enrichment engine 114 may determine whether a data type (e.g., numerical, Boolean, string) of the first set of data values matches a data type of the second set of data values. In some embodiments, the enrichment engine 114 may determine a likelihood correspondence based on a threshold match between the first set of data values and the second set of data values. In some embodiments, the enrichment engine 114 may compute an aggregated edit distance between the first set of data values and the second set of data values. In such embodiments, a likelihood of correspondence between the two sets of data values increases as the aggregated edit distance decreases.

In some embodiments, the typeclass suggestion engine 116 can automatically suggest typeclasses for annotating various datasets. For example, in some embodiments, a typeclass can automatically be suggested for a given column of a database table based on a data type associated with the column. For example, a database table column can include data values corresponding to timestamps. In this example, the typeclass suggestion engine 116 can evaluate the data values to determine that a typeclass corresponding to "timestamps" can be used to annotate the database table column. In some embodiments, a typeclass can automatically be suggested for a given column of a database table based on a pattern (e.g., data format) recognized in data values stored in the column. For example, a database table column can include data values corresponding to mailing addresses. In this example, the typeclass suggestion engine 116 can evaluate the data values to determine that a typeclass corresponding to "physical address" can be used to annotate the database table column. Many variations are possible. In some embodiments, the typeclass suggestion engine 116 can utilize pre-defined regular expressions to evaluate data values. In some embodiments, the typeclass suggestion engine 116 can utilize trained machine learning models to evaluate data values. For example, a machine learning model can be trained to determine that a set of data values correspond to a particular data type. Similarly, a machine learning model can be trained to determine that a set of data values correspond to a particular data format. In some embodiments, typeclasses for a first database table column can be suggested based on an evaluation of data values included in that column. In such embodiments, if the evaluated data values correspond to (or overlap with) data values included in a second database table column with a threshold likelihood, then any typeclasses assigned to the second database table can be provided as suggestions for annotating the first database table. In some embodiments, correspondence between data values can be determined based on a likelihood of correspondence, as described above. In some embodiments, typeclasses for a first database table column can be suggested based on historical join data describing join operations that were performed using the first database table column. For example, if the first database table column was joined with a second database table column at least a threshold amount of times (e.g., number, percentage) by various users, then any typeclasses associated with the second database table column can be provided as suggestions for annotating the first database table column. In some embodiments, database table columns that were previously joined with the first database table column can be ranked. In some embodiments, the database table columns can be ranked based on a respective count of join operations that were performed between the database table column and the first database table column. In some embodiments, typeclasses for database table columns that satisfy a threshold rank can be provided as suggestions for annotating the first database table column. In some embodiments, typeclasses for database table columns that were most recently joined with the first database table column can be provided as suggestions for annotating the first database table column. Many variations are possible.

Figure 2:
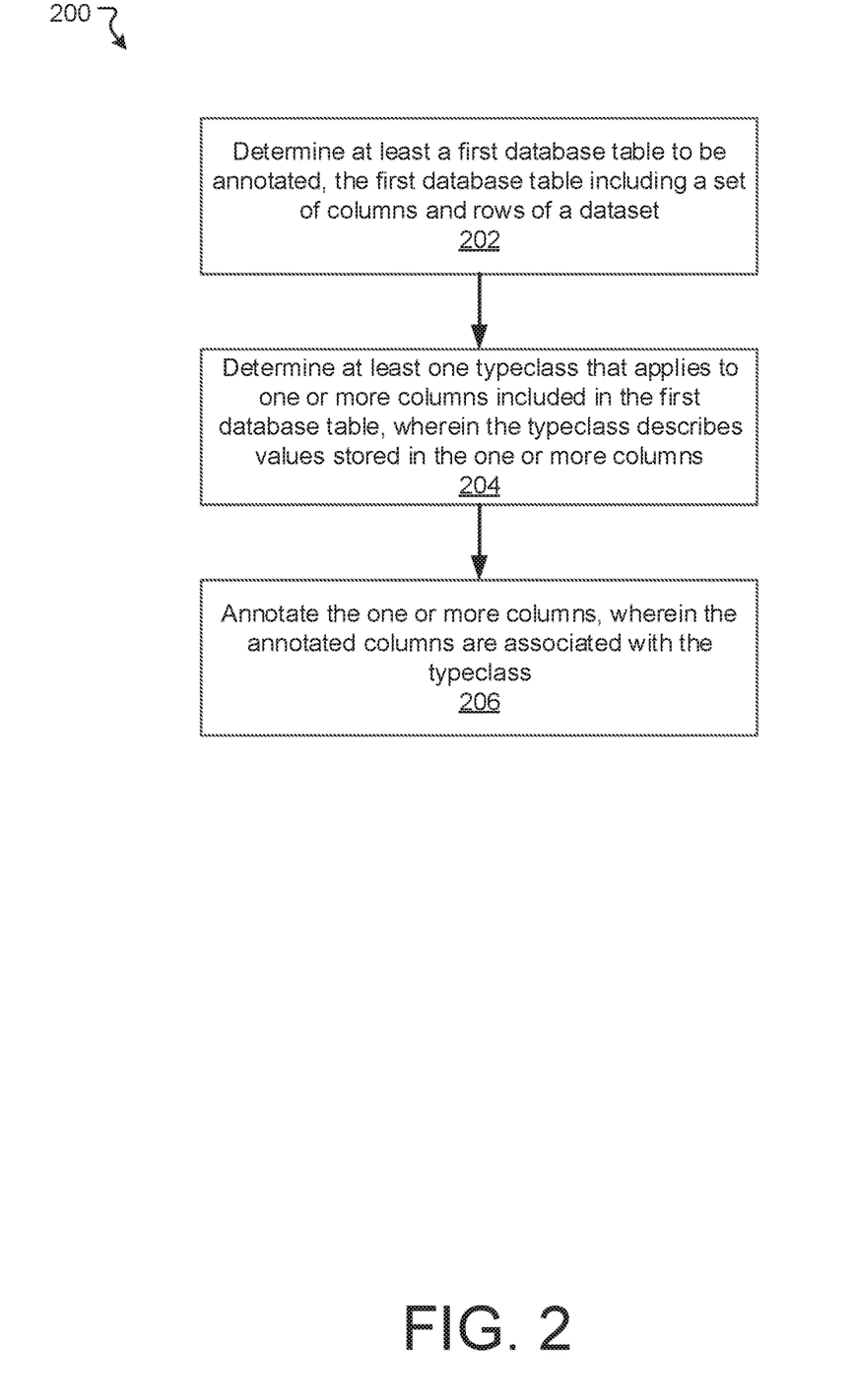
FIG. 2 is a diagram of an example of a method, per some embodiments.

FIG. 2 illustrates an example method 200, per some embodiments. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices. The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, at least a first database table to be annotated is determined, the first database table including a set of columns and rows of a dataset. Operation 202 may be performed by one or more physical processors executing one or more engines as described above, in accordance with one or more implementations.

At an operation 204, at least one typeclass that applies to one or more columns included in the first database table is determined, wherein the typeclass describes values stored in the one or more columns. Operation 204 may be performed by one or more physical processors executing one or more engines as described above, in accordance with one or more implementations.

At an operation 206, the one or more columns are annotated, wherein the annotated columns are associated with the typeclass. Operation 206 may be performed by one or more physical processors executing one or more engines as described above, in accordance with one or more implementations.

Figure 3:
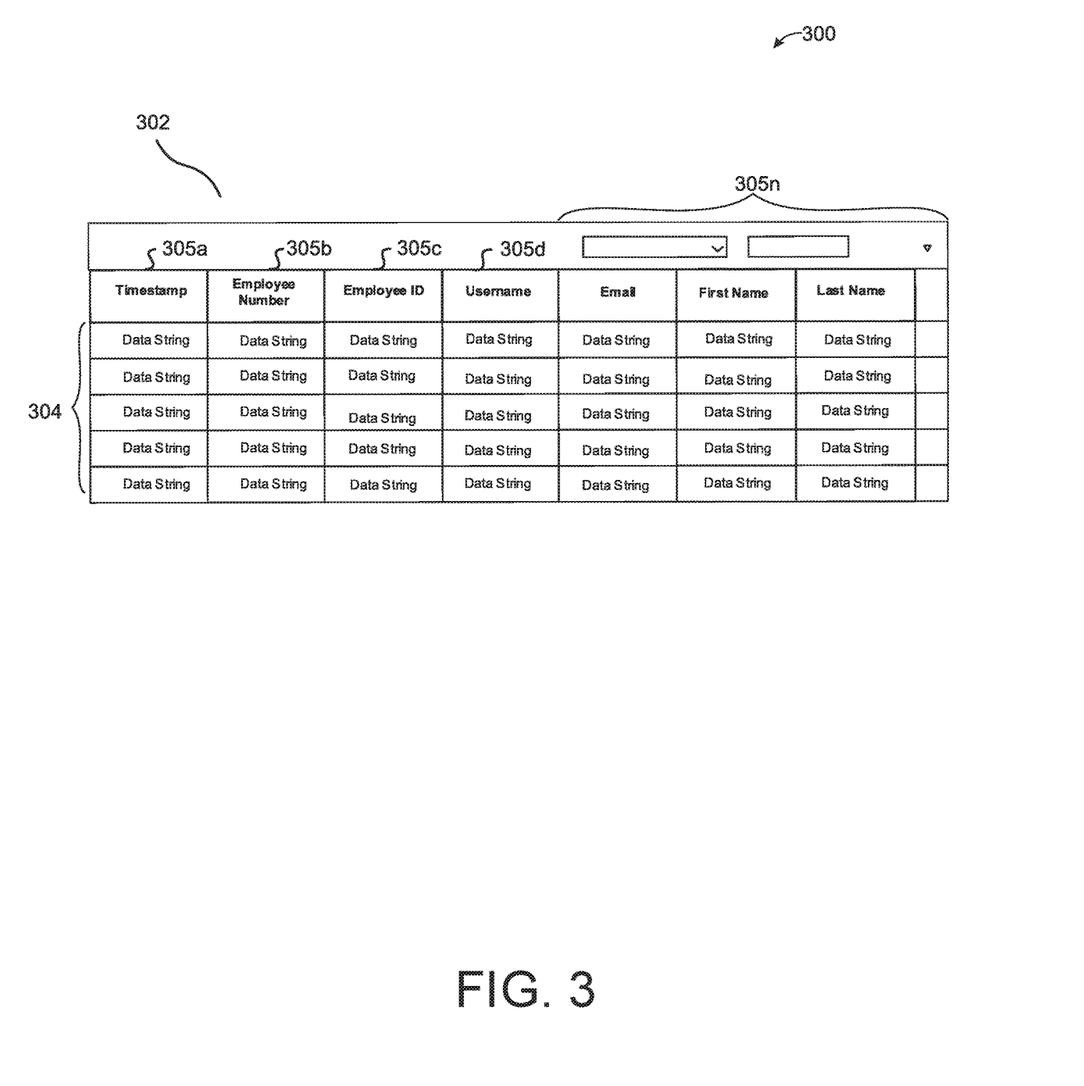
FIG. 3 is a diagram of an interface configured to display data sets, per some embodiments.

FIG. 3 is a diagram of an interface 300 configured to display datasets, per some embodiments. The graphical user interface 300 shows a database table 302 with columns (e.g., columns 305a, 305b, 305c, and 305d). Additionally, the table may include any number of columns 305n.

Any of the columns (e.g., columns 305a, 305b, 305c, 305d) may be associated with typeclasses. For example, the column 305b corresponding to "employee number" may be associated with an "employee identifier" typeclass. As mentioned, a typeclass can reference a particular data type and/or particular data format. In some embodiments, a typeclass may be associated with one or more validation rules. These validation rules can be applied to data values 304 of columns that have been annotated (or labeled) with the typeclass.

Figure 4:
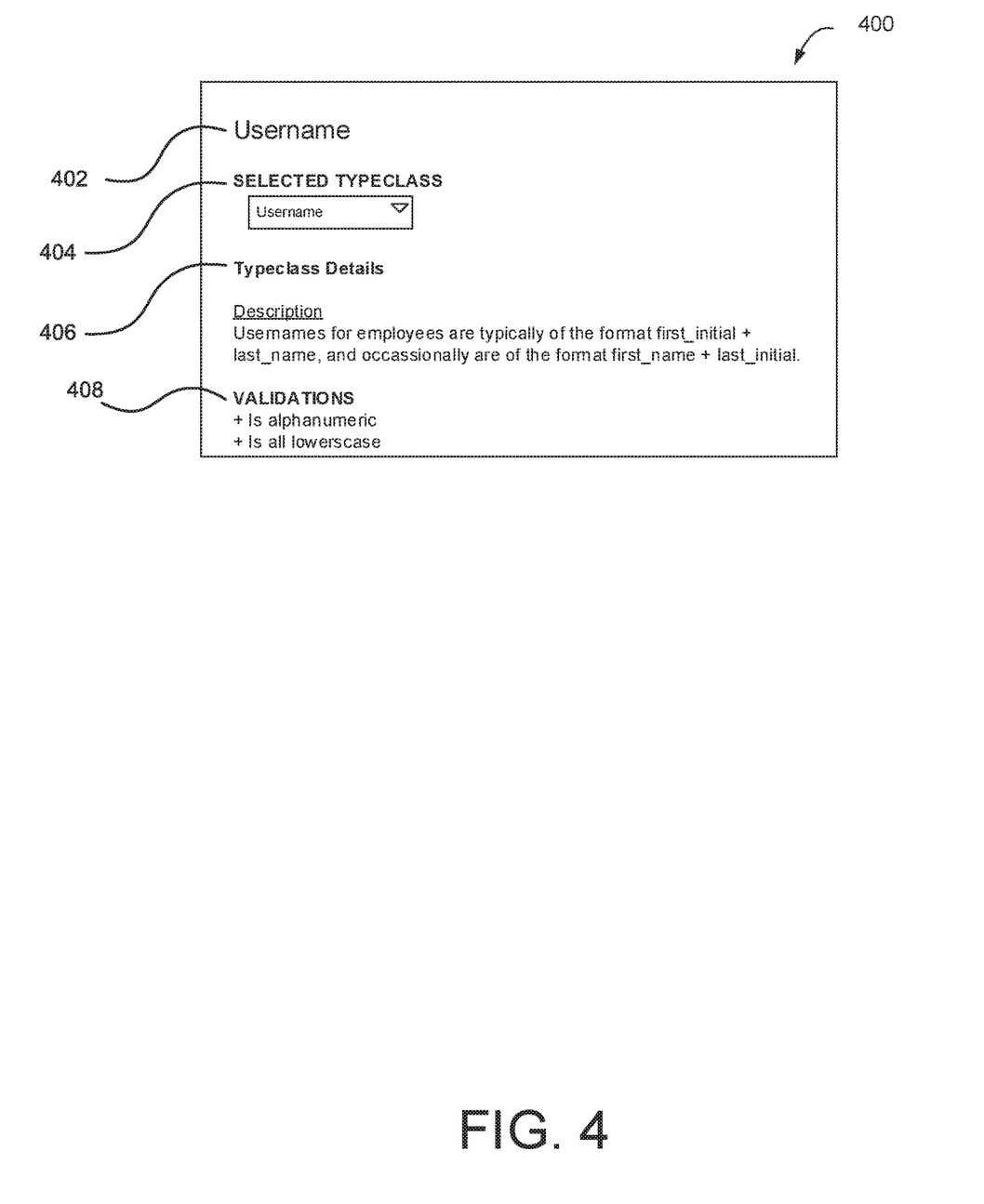
FIG. 4 is a diagram of an interface configured to provide a typeclass selection for a particular dataset, per some embodiments.

More detail with regards to typeclasses are depicted in FIG. 4. FIG. 4 is an interface 400 for annotating a dataset (e.g., database table column) with a particular typeclass. For example, a user may have selected the column 305d corresponding to usernames in FIG. 3 to annotate the column 305d with a typeclass. After selecting the column 305d, the user may be directed to the interface 400. The interface 400 provides the user with options for annotating (or labeling) a dataset 402 (e.g., data values 304 corresponding to the column 305d) with a typeclass. In this example, the user has the option to select from among various typeclasses using a drop-down menu 404. When a typeclass is selected, the interface 400 can provide details 406 about the selected typeclass. In some embodiments, the interface 400 can provide information 408 about validations associated with the selected typeclass. As mentioned, these validations can be applied to the dataset 402 (e.g., data values 304 corresponding to the column 305d). Many variations are possible.

Figure 5:
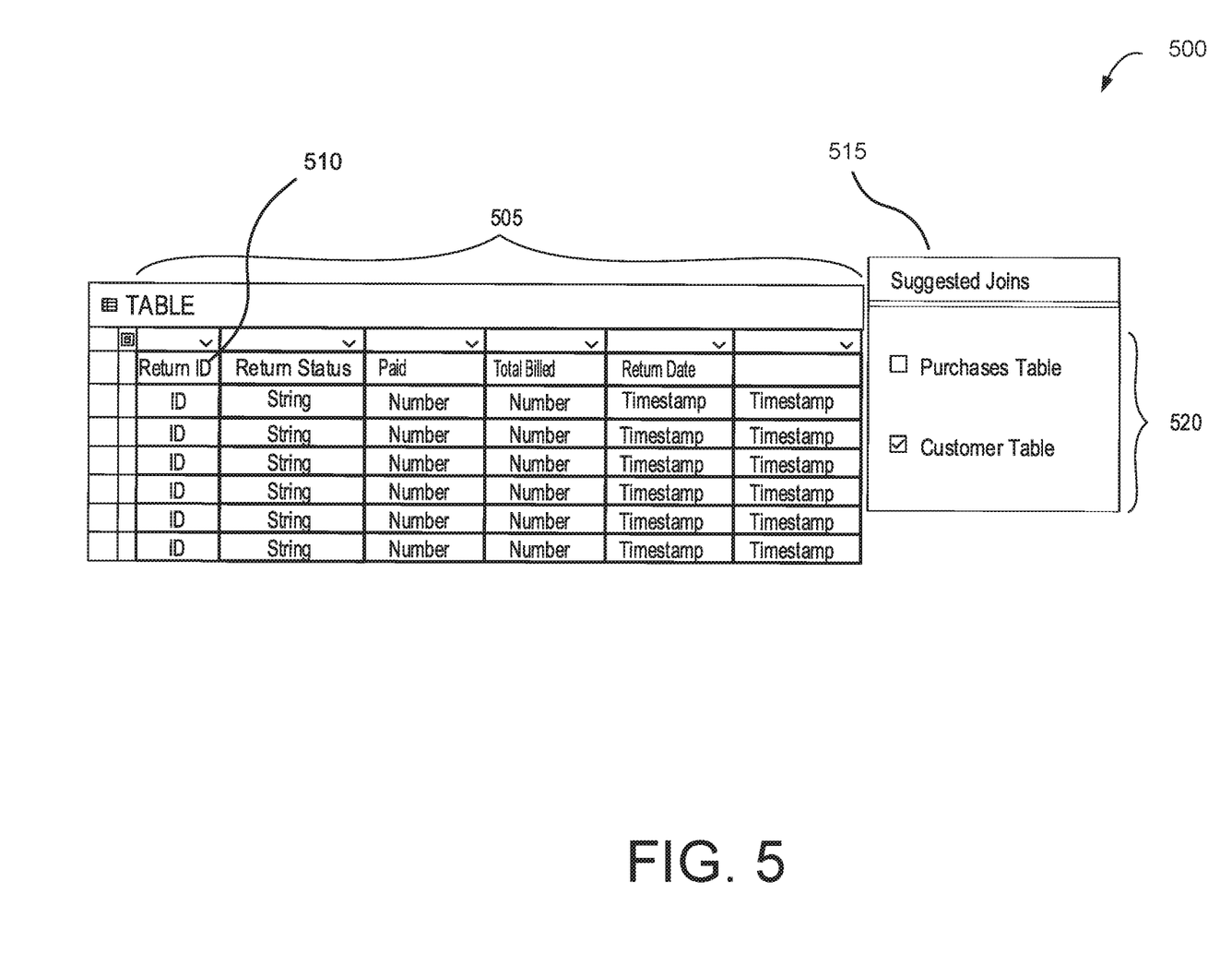
FIG. 5 is a diagram of an interface configured to display a join operation of a first dataset and a second dataset, per some embodiments.

FIG. 5 is a diagram of an interface 500 displaying a join operation of a first dataset and a second dataset, per some embodiments. The join operation includes a graphical depiction of proposed join operations between datasets. In this example, the join operation involves a first database table 505 which includes at least one column 510 ("return id") associated with a "return identifier" typeclass. In some embodiments, the first database table 505 can be enriched with data from other database tables. For example, in some embodiments, the first database table 505 can be enriched with data from other database tables that also include a column associated with the "return identifier" typeclass. In such embodiments, the join operation can join the first database table 505 with another database table based on the columns associated with the "return identifier" typeclass. Many variations are possible.

In some embodiments, the interface 500 can provide suggestions 515 for enriching the database table 505. For example, the suggestions 515 can include other tables 520 that may be joined with the database table 505 to enrich data in the database table 505. The user can select a suggested table 520 to perform a join operation with the database table 505. Once joined, the interface 500 can provide a view of the first database table 505 joined with the selected table, for example, at the column associated with the "return identifier" typeclass.

Hardware Implementation

Figure 6:
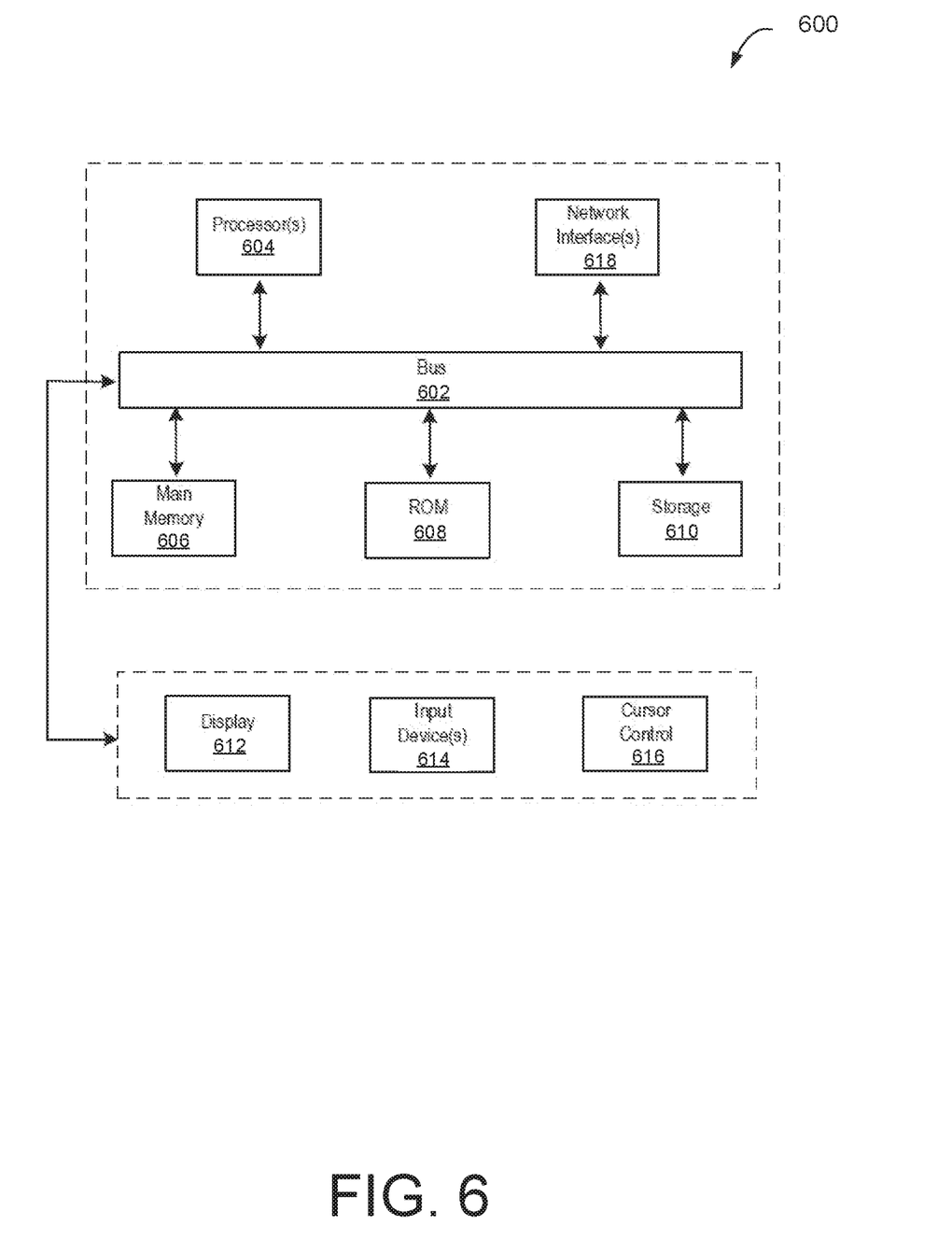
FIG. 6 depicts a block diagram of an example of a computer system upon which any of the embodiments described herein may be implemented.

FIG. 6 depicts a block diagram of an example of a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 702 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be included of connected logic units, such as gates and flip-flops, and/or may be included of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. Per one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may include non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that include bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such embodiment, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 704 as it is received, and/or stored in storage device 610, or other non-volatile storage for later execution.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "datastore," and/or "database" may include software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may include more, less, or functionally equivalent engines, systems, datastores, or databases, and still be within the scope of present embodiments. For example, the functionality of the various systems, engines, datastores, and/or databases may be combined or divided differently.

The datastores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate embodiments are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A system comprising:
   one or more processors; and
   a memory storing instructions that, when executed by the one or more processors, cause the system to perform:
      determining a column of a first database table to be annotated, the first database table including a set of columns and rows of a dataset;
      using a trained machine learning model:
         determining a typeclass that applies to the column of the first database table, wherein the typeclass describes values stored in the column;
         annotating the column based on the determined typeclass;
         determining that the typeclass also applies to a second column included in a second database table in response to a probability of a correspondence between respective data values and data formats in the column and the second column satisfying a threshold;
      determining, to join the column and the second column in response to:
         the determination that the typeclass also applies to the second column; and
         a historical frequency of joining the first column and the second column exceeding a second threshold, the historical frequency comprising a degree of recency of a previous join operation between the column and the second column; and
      joining, in response to the determination to join the column and the second column, the column and the second column.

2. The system of claim 1, wherein the typeclass describes metadata information for the one or more columns.

3. The system of claim 2, wherein the metadata information describes a data type corresponding to data values in the one or more columns.

4. The system of claim 2, wherein the metadata information describes a data format corresponding to data values in the one or more columns.

5. The system of claim 1, wherein the typeclass is associated with one or more data validations.

6. The system of claim 5, wherein the data validations are automatically applied to validate values stored in the one or more columns.

7. The system of claim 1, wherein the instructions further cause the system to perform:
   joining the first database table with at least one second database table based at least in part on the one or more annotated columns.

8. The system of claim 1, wherein the probability of the correspondence between respective data values or data formats in the column and the second column is determined based on patterns of data entries in the column and the second column.

9. The system of claim 8, wherein the patterns include relative positions of signs in the data entries.

10. The system of claim 1, wherein the determination to join the column to the second column is further based on an aggregated edit distance between entries of the column and second entries of the second column.

11. A method being implemented by a computing system including one or more physical processors and storage media storing machine-readable instructions, the method comprising:
   determining a column of a first database table to be annotated, the first database table including a set of columns and rows of a dataset;
   using a trained machine learning model:
      determining a typeclass that applies to the column of the first database table, wherein the typeclass describes values stored in the column;
      annotating the column based on the determined typeclass;
      determining that the typeclass also applies to a second column included in a second database table in response to a probability of a correspondence between respective data values and data formats in the column and the second column satisfying a threshold;
   determining to join the column and the second column in response to a historical frequency of joining the first column and the second column exceeding a second threshold, the historical frequency comprising a degree of recency of a previous join operation between the column and the second column; and joining, in response to the determination to join the column and the second column, the column and the second column.

12. The method of claim 11, wherein the typeclass describes metadata information for the one or more columns.

13. The method of claim 11, wherein the typeclass is associated with one or more data validations.

14. The method of claim 13, wherein the data validations are automatically applied to validate values stored in the one or more columns.

15. The method of claim 11, wherein the instructions further cause the processors to perform:

joining the first database table with at least one second database table based at least in part on the one or more annotated columns.

16. A non-transitory computer readable medium comprising instructions that, when executed, cause one or more processors to perform:

determining a column of a first database table to be annotated, the first database table including a set of columns and rows of a dataset;

using a trained machine learning model:

determining a typeclass that applies to the column of the first database table, wherein the typeclass describes values stored in the column;

annotating the column based on the determined typeclass;

determining that the typeclass also applies to a second column included in a second database table in response to a probability of a correspondence between respective values and data formats in the column and the second column satisfying a threshold;

determining to join the column and the second column in response to a historical frequency of joining the first column and the second column exceeding a second threshold, the historical frequency comprising a degree of recency of a previous join operation between the column and the second column; and joining, in response to the determination to join the column and the second column, the column and the second column.

17. The non-transitory computer readable medium of claim 16, wherein the typeclass describes metadata information for the one or more columns.

18. The non-transitory computer readable medium of claim 17, wherein the metadata information describes a data type corresponding to data values in the one or more columns.

19. The non-transitory computer readable medium of claim 17, wherein the metadata information describes a data format corresponding to data values in the one or more columns.

\* \* \* \* \*